(12) United States Patent
Tamaki

(10) Patent No.: US 9,117,555 B2
(45) Date of Patent: Aug. 25, 2015

(54) TRANSPORTATION CONTAINER OF FUEL ASSEMBLY

(75) Inventor: Hiroki Tamaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 155 days.

(21) Appl. No.: 13/386,754

(22) PCT Filed: Jul. 5, 2010

(86) PCT No.: PCT/JP2010/061393
§ 371 (c)(1),
(2), (4) Date: Jan. 24, 2012

(87) PCT Pub. No.: WO2011/013479
PCT Pub. Date: Feb. 3, 2011

(65) Prior Publication Data
US 2012/0126150 A1    May 24, 2012

(30) Foreign Application Priority Data

Jul. 31, 2009   (JP) ................. 2009-179861

(51) Int. Cl.
*G21F 5/08*   (2006.01)
*G21F 5/008*   (2006.01)
(Continued)

(52) U.S. Cl.
CPC ............ *G21F 5/008* (2013.01); *G21F 5/012* (2013.01); *G21F 5/06* (2013.01); *G21F 9/36* (2013.01);
(Continued)

(58) Field of Classification Search
CPC ............ G21F 5/08; G21F 5/008; G21C 5/00; G21C 19/05; G21Y 2002/303; G21Y 2002/305; G21Y 2004/30
USPC ....................................... 250/506.1
See application file for complete search history.

(56) References Cited

U.S. PATENT DOCUMENTS 3,036,965 A * 5/1962 Braun .................... 376/221
5,640,435 A * 6/1997 Kurosaki et al. ........... 376/444
(Continued)

FOREIGN PATENT DOCUMENTS

DE   102 26 245 A1   1/2004
JP   10-246796 A     9/1998
(Continued)

OTHER PUBLICATIONS

International Search Report of PCT/JP2010/061393, date of mailing Sep. 28, 2010.
(Continued)

*Primary Examiner* — Phillip A Johnston
*Assistant Examiner* — Sean Luck
(74) *Attorney, Agent, or Firm* — Westerman, Hattori, Daniels & Adrian, LLP

(57) ABSTRACT

There are provided: a container body (11) that has an opening in one end; a lid member (12A) that seals the opening; a prismatic pipe (30) that is arranged in the container body (11); a fuel holder (20) that covers a side surface of a fuel assembly when inserted into the prismatic pipe (30); and pressing members (37a, 37b) that are arranged on the prismatic pipe (30) and press the fuel holder (20), in the prismatic pipe (30), against inner surfaces of the prismatic pipe (30). One end (23) of the fuel holder (20) is formed in a tapered shape inclining toward an inside of the fuel holder (20). One end of the prismatic pipe (30) is provided with a first guide member (40) that has a recess (41) conforming to a shape of the one end (23) of the fuel holder (20).

6 Claims, 6 Drawing Sheets

(51) Int. Cl.
*G21F 9/36* (2006.01)
*G21F 5/06* (2006.01)
*G21F 5/012* (2006.01)

(52) U.S. Cl.
CPC ............ *G21F 5/08* (2013.01); *G21Y 2002/303* (2013.01); *G21Y 2002/305* (2013.01); *G21Y 2004/30* (2013.01)

(56) References Cited

U.S. PATENT DOCUMENTS

| | | | |
|---|---|---|---|
| 5,783,832 A * | 7/1998 | Sandor | 250/506.1 |
| 5,949,084 A * | 9/1999 | Schwartz | 250/506.1 |
| 6,009,136 A * | 12/1999 | Loftis et al. | 376/272 |
| 6,108,392 A * | 8/2000 | Yoshizawa et al. | 376/272 |
| 6,128,360 A | 10/2000 | Yoshizawa et al. | |
| 6,169,777 B1 | 1/2001 | Yoshizawa et al. | |
| 6,580,085 B1 | 6/2003 | Gaucherand | |
| 6,683,931 B1 * | 1/2004 | Stilwell et al. | 376/272 |
| 6,748,042 B1 * | 6/2004 | Stilwell et al. | 376/272 |
| 6,963,073 B2 * | 11/2005 | Martin et al. | 250/515.1 |
| 7,019,317 B1 * | 3/2006 | Martin et al. | 250/506.1 |
| 2006/0091329 A1 * | 5/2006 | Eguchi | 250/506.1 |
| 2008/0203327 A1 * | 8/2008 | Hempy et al. | 250/506.1 |
| 2009/0129529 A1 * | 5/2009 | Wazybok et al. | 376/272 |

FOREIGN PATENT DOCUMENTS

| | | |
|---|---|---|
| JP | 11-23789 A | 1/1999 |
| JP | 3069536 B2 | 7/2000 |
| JP | 2002-538473 A | 11/2002 |
| JP | 2003-344580 A | 12/2003 |
| JP | 2004-325454 A | 11/2004 |
| JP | 2005-55435 A | 3/2005 |
| JP | 4322423 B2 | 9/2009 |

OTHER PUBLICATIONS

Written Opinion of the International Searching Authority of PCT/JP2010/061393, dated Sep. 28, 2010.
Extended European Search Report dated Feb. 18, 2014, issued in corresponding European Patent Application No. 10804226.8 (5 pages).
Decision of a Patent Grant dated Jun. 16, 2015, issued in corresponding Japanese application No. 2009-179861 (4 pages).

* cited by examiner

TRANSPORTATION CONTAINER OF FUEL ASSEMBLY

FIELD

The present invention relates to a transportation container for containing a fuel assembly for transportation.

BACKGROUND

New fuel assemblies to be used in a nuclear power plant (fresh fuel assemblies; hereinafter, referred to simply as fuel assemblies) are manufactured in a fuel production plant before transported to the nuclear power plant as contained in transportation containers which have shielding, sealing, and other functions. If fuel assemblies under transportation are subjected to vibrations or an impact during transportation, the fuel assemblies may be deformed. The fuel assemblies may also be damaged by friction with metal contacting parts. In order not to impair product integrity and reliability, fuel assemblies therefore need to be securely fixed to the transportation containers.

In a conventional transportation container, fuel assemblies are placed sideways in the container body, and then the fuel assemblies are fastened by attaching fastening members such as a clamping frame at predetermined intervals over the entire length of the fuel assemblies (for example, see Patent Literature 1). Since fuel assemblies have a length of approximately 4 m, the fastening operation takes a lot of time and effort. The operation of loading fuel assemblies into a transportation container has thus been quite time-consuming.

Patent Literature 2 describes a transportation container which has been known as an example of a transportation container for facilitated fastening operation. The transportation container described in Patent Literature 2 includes a basket for containing a plurality of fuel assemblies inside the transportation container. The basket includes a plurality of rectangular pipes that accommodate fuel assemblies. Fastening devices are arranged along the longitudinal directions of two of the four side walls that constitute each rectangular pipe. The fastening devices each include: a plurality of clamp plates that are arranged at predetermined intervals along the longitudinal direction of the rectangular pipe and configured to be movable back and forth in the rectangular pipe; a plurality of drive units that are linked to the respective clamp plates and drive the clamp plates back and forth; and a rotating shaft that connects the drive units and simultaneously drives the drive units for rotation. An operator can operate an operation part at the end of the rotating shaft in an opening of the basket, whereby the rotation is transmitted to the plurality of drive units through the rotating shaft and the plurality of clamp plates are simultaneously driven back and forth. Seats for holding the lower ends of fuel assemblies are installed at the lower ends of the rectangular pipes that constitute the basket. The seats have a recessed shape conforming to the tapered lower end of a fuel assembly.

To load fuel assemblies into the foregoing transportation container, the transportation container is initially arranged upright. Fuel assemblies are vertically hung down and inserted into the rectangular pipes of the basket. Here, the lower ends of the fuel assemblies are guided by the recesses in the seats arranged at the bottoms of the rectangular pipes and thereby supported by the seats. Subsequently, the clamp plates of the foregoing fastening devices are driven so that the plurality of clamp plates press and fasten the fuel assemblies to the wall surfaces of the rectangular pipes. This completes the operation of loading fuel assemblies. According to the transportation container of Patent Literature 2, the operation of fastening fuel assemblies can be performed more easily than with the transportation container of Patent Literature 1. It is therefore possible to reduce the time needed for the operation of loading fuel assemblies into a transportation container.

CITATION LIST

Patent Literature

Patent Literature 1: Japanese Patent No. 4322423
Patent Literature 2: Japanese Patent No. 3069536

SUMMARY

Technical Problem

With the transportation container of Patent Literature 2, however, fuel assemblies are directly inserted into the rectangular pipes of the basket. The fuel assemblies can thus undergo unnecessary force or cause friction with the wall surfaces of the rectangular pipes or the seats when the lower ends of the fuel assemblies are guided into the seats of the rectangular pipes and when the side surfaces of the fuel assemblies are pressed by the clamp plates against the wall surfaces of the rectangular pipe. This may lower the integrity and reliability of the fuel assemblies.

The present invention has been achieved in view of the foregoing, and it is an object thereof to provide a transportation container of a fuel assembly which can facilitate the operation of loading a fuel assembly into the container and can maintain the integrity and reliability of the fuel assembly against force or friction acting on the fuel assembly when loading the fuel assembly.

Solution to Problem

According to an aspect of the present invention, a transportation container of a fuel assembly includes: a container body that has an opening in one end; a lid member that seals the opening; a prismatic pipe that is arranged in the container body; a fuel holder that covers side surfaces of a fuel assembly when inserted into the prismatic pipe; and a pressing member that is arranged on the prismatic pipe and presses, in the prismatic pipe, the fuel holder against an inner wall surface of the prismatic pipe. One end of the fuel holder is formed in a tapered shape inclining toward an inside of the fuel holder, and one end of the prismatic pipe is provided with a first guide member that has a recess corresponding to a shape of the one end of the fuel holder.

According to this transportation container of a fuel assembly, when the fuel holder containing a fuel assembly is inserted into the prismatic pipe, the one end of the fuel holder is guided by the recess in the guide member of the prismatic pipe. This can semiautomatically position the fuel holder to a proper storing position. As a result, the operation of loading the fuel assembly into the transportation container can be easily performed. Moreover, since the fuel assembly is protected by the fuel holder when loaded into the container body, it is possible to maintain integrity and reliability against force or friction acting on the fuel assembly in the loading operation. Furthermore, during transportation, deformation of the fuel assembly can be suppressed by the rigidity of the fuel holder. This makes it possible to reduce the points to be pressed by pressing members for pressing and fixing the fuel assembly as compared to those in the conventional container. This can significantly simplify the internal structure of the container body.

Advantageously, in the transportation container of a fuel assembly, both an outer periphery of the fuel holder and an inner periphery of the prismatic pipe are rectangular, the one end of the fuel holder is guided by the recess in the first guide member, whereby the fuel holder is arranged in contact with two inner walls of the prismatic pipe, and the fuel holder is pressed against the two inner wall surfaces of the prismatic pipe by the pressing member so that the fuel holder is accommodated in the prismatic pipe.

According to this transportation container of a fuel assembly, it is possible to facilitate the loading operation of loading the transportation container with a fuel assembly that is intended for use in a light water reactor.

Advantageously, in the transportation container of a fuel assembly, an other end of the fuel holder is formed in a tapered shape inclining toward the inside of the fuel holder, an other end of the prismatic pipe is provided with a second guide member that has a recess corresponding to the other end of the fuel holder, and the one end of the fuel holder is guided by the recess in the first guide member and the other end of the fuel holder is guided by the recess in the second guide member, whereby the fuel holder is configured to be arranged in contact with the two inner walls of the prismatic pipe.

By using this transportation container of a fuel assembly, the one end of the fuel holder is guided by the recess in the first guide member and the other end of the fuel holder is guided by the recess in the second guide member. This makes it possible to position the fuel holder to the storing position with higher reliability.

Another transportation container of a fuel assembly according to the present invention is characterized in that the fuel holder includes two plate members that have an L-shaped cross section, the two plate members being rotatably linked to each other through a hinge.

By using this transportation container of a fuel assembly, it is possible to rotate one of the L-shaped steel plates via the hinge to open the interior of the fuel holder when putting a fuel assembly into the fuel holder. This can facilitate putting a fuel assembly into the fuel holder.

Advantageously, in the transportation container of a fuel assembly, the prismatic pipe is made of aluminum or an aluminum alloy to which boron or a boron compound is added.

By using this transportation container of a fuel assembly, the prismatic pipe has the functions of both a neutron absorption member and a structural strength member. The internal structure of the container body can thus be further simplified.

Advantageous Effects of Invention

By using the transportation container of a fuel assembly of the present invention, when the fuel holder containing a fuel assembly is inserted into the prismatic pipe, the one end of the fuel holder is guided by the recess in the guide member of the prismatic pipe. This can semiautomatically position the fuel holder to the storing position. As a result, the operation of loading a fuel assembly into the transportation container can be easily performed. Moreover, since the fuel assembly is protected by the fuel holder when loaded into the container body, it is possible to suppress a drop in integrity and reliability due to force or friction acting on the fuel assembly in the loading operation. Furthermore, during transportation, deformation of the fuel assembly is suppressed by the rigidity of the fuel holder. This makes it possible to reduce the points to be pressed by pressing members for pressing and fixing the fuel assembly as compared to those in the conventional container. This can significantly simplify the internal structure of the container body.

DESCRIPTION OF EMBODIMENT

Hereinafter, an embodiment of the present invention will be described in detail with reference to the drawings. It should be noted that the present invention is not limited by the embodiment. The components of the following embodiment may include ones that are easily conceivable by those skilled in the art, or substantially the same ones.

A transportation container of a fuel assembly (hereinafter, referred to in short as "transportation container") according to the present invention is suitable for a fuel assembly of a pressurized water reactor (PWR). Applications to nuclear plants in general, including a boiling water reactor (BWR), are not intended to be excluded. While the transportation container according to the present invention is particularly suited to transportation of a fuel assembly, storage applications are not excluded. The transportation container according to the present invention is suitably used in transporting a fuel assembly (new fuel assembly) that is newly manufactured in a fuel production plant and to be loaded into a nuclear reactor.

Figure 1:
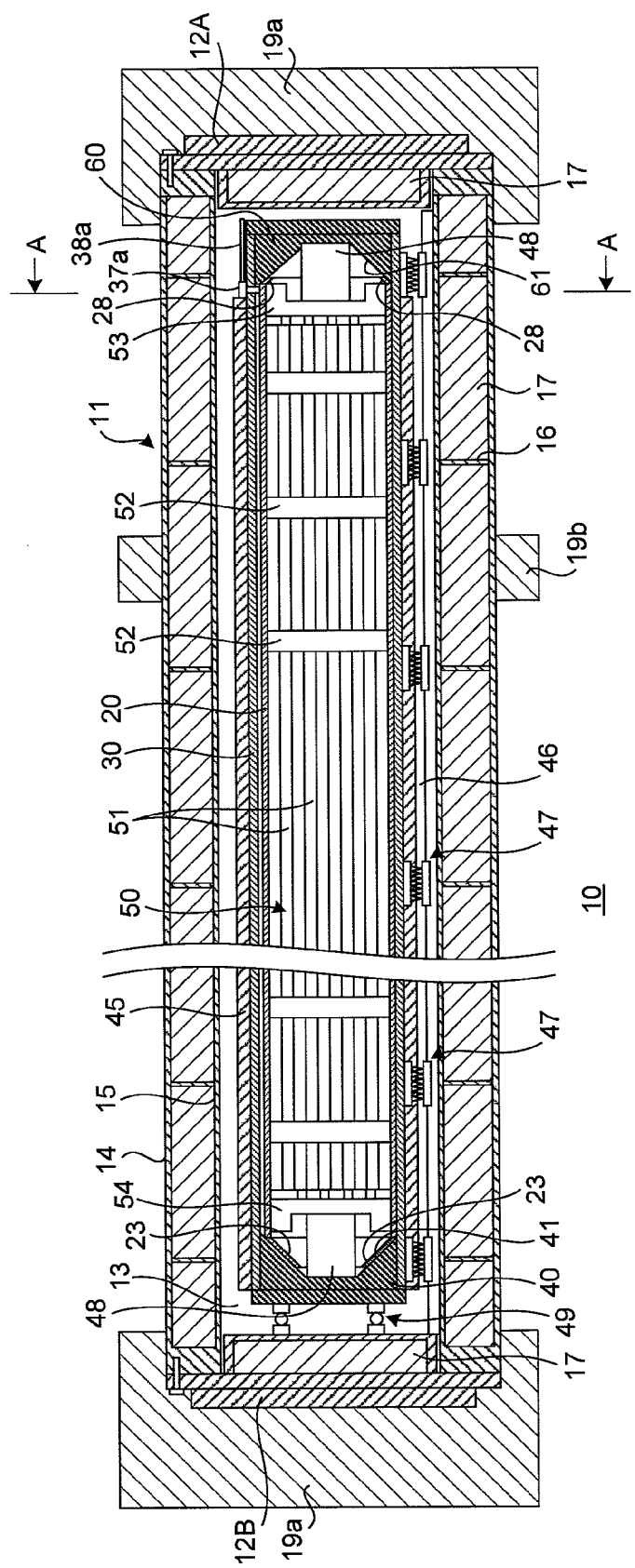
FIG. 1 is a cross-sectional view showing a state where a transportation container according to the present embodiment is loaded with a fuel assembly.
Figure 2:
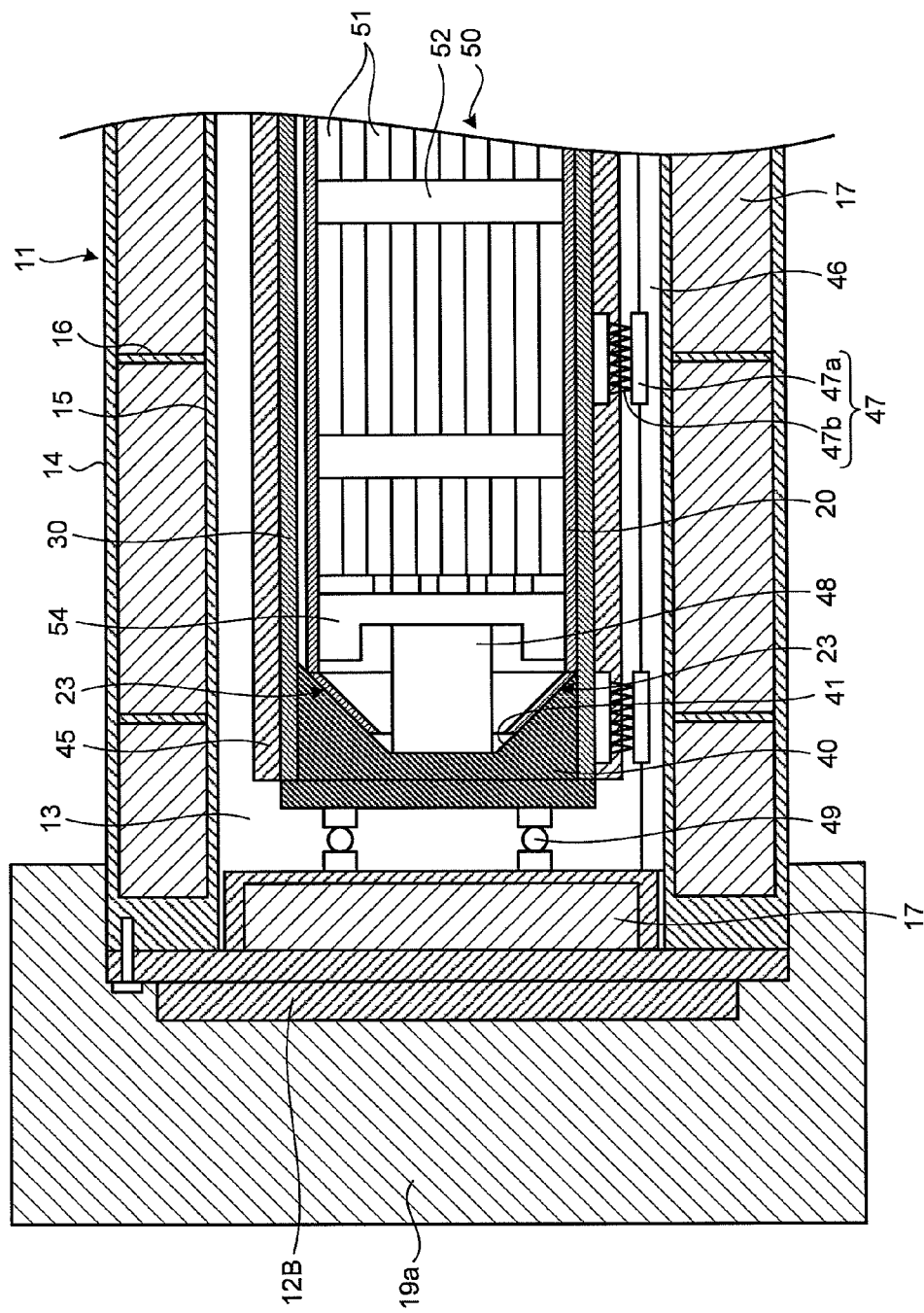
FIG. 2 is an enlarged view showing the lower end of the transportation container shown in FIG. 1.
Figure 3:
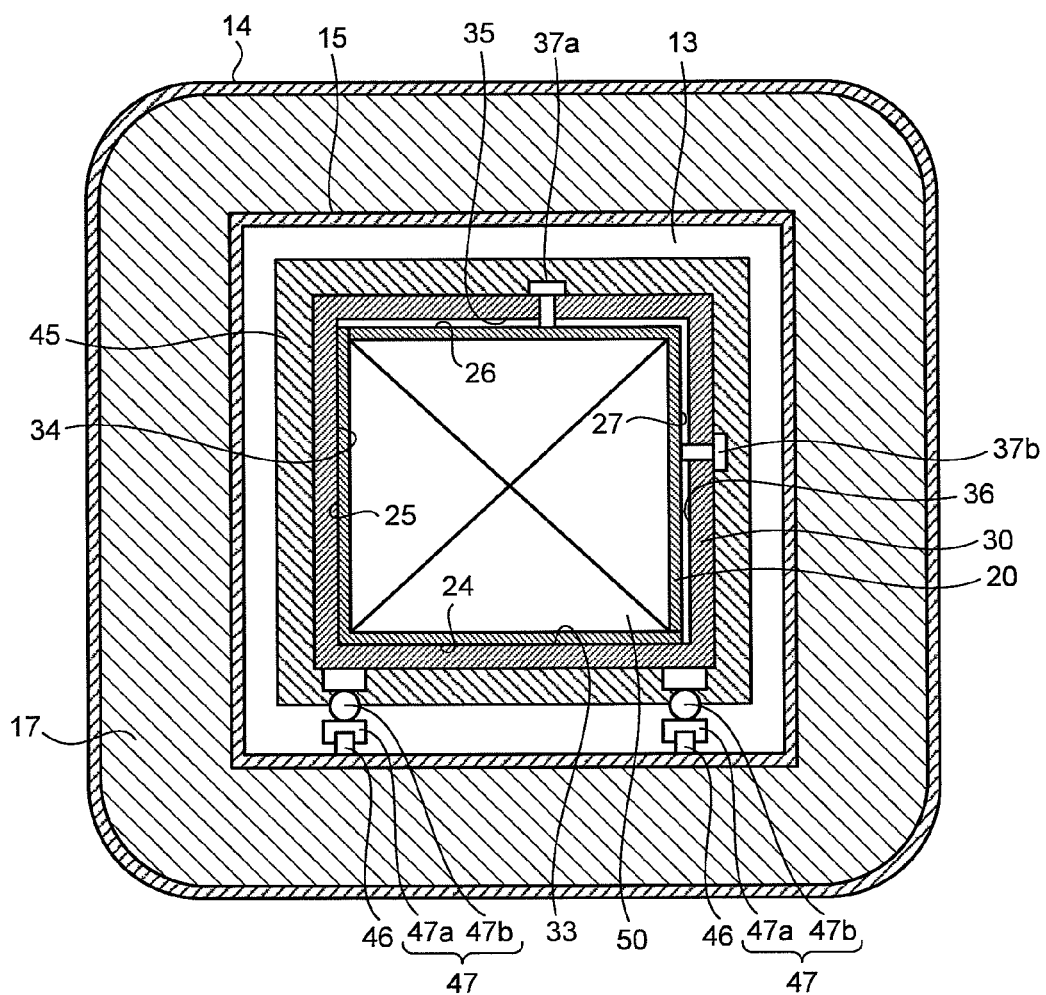
FIG. 3 is a cross-sectional view taken along line A-A of FIG. 1.
Figure 4:
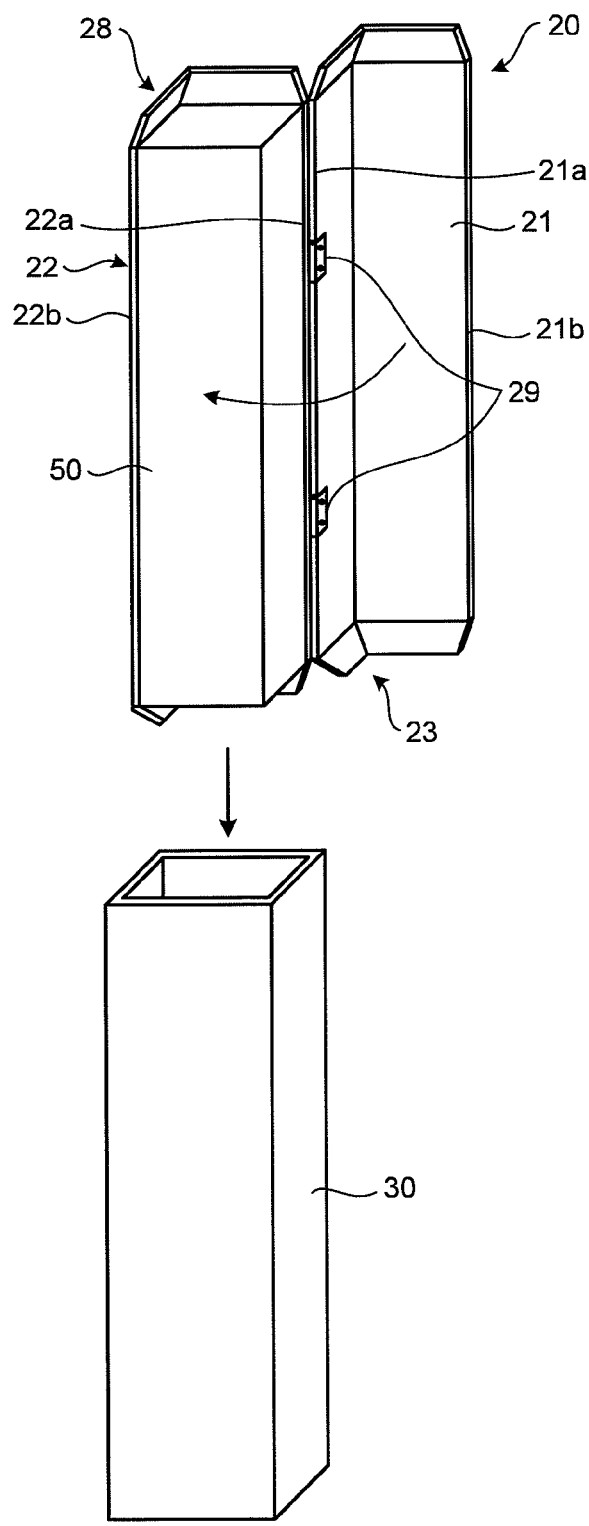
FIG. 4 is a conceptual diagram of a fuel holder and a prismatic pipe of the transportation container shown in FIG. 1.

FIG. 1 is a cross-sectional view showing a state where the transportation container according to the present embodiment is loaded with a fuel assembly. FIG. 2 is an enlarged view showing the vicinity of the lower end of the transportation container shown in FIG. 1. FIG. 3 is a cross-sectional view taken along the line A-A in FIG. 1. FIG. 4 is a conceptual diagram of a fuel holder and a prismatic pipe of the transportation container shown in FIG. 1. The transportation container 10 illustrated in FIG. 1 is mainly used to contain a fuel assembly 50 that is manufactured in a fuel production plant, and transport the fuel assembly 50 to a nuclear power plant. The transportation container 10 includes a container body 11 which is open at both ends, an upper lid member 12A and a lower lid member 12B which seal the openings at the respective ends of the container body 11, and a fuel holder 20 and a prismatic pipe 30. As shown in FIG. 1, an internal space 13 formed by the container body 11, the upper lid member 12A, and the lower lid member 12B constitutes a space for containing the fuel assembly 50. The fuel holder 20, the prismatic pipe 30, and other members for holding the fuel assembly 50 are accommodated in the internal space 13.

When transporting the fuel assembly 50, the transportation container 10 is transported in a sideways position so that the fuel assembly 50 contained inside is held generally horizontally as shown in FIG. 1. On the other hand, when loading the fuel assembly 50 into the transportation container 10, the transportation container 10 is vertically erected with the upper lid member 12A up and the lower lid member 12B down. The fuel holder 20 holding the fuel assembly 50 is hung down into the container through the upper opening of the container body 11. To take the fuel assembly 50 out of the transportation container 10, the transportation container 10 is arranged upright as with the foregoing loading time, and the fuel holder 20 holding the fuel assembly 50 is hung and lifted up through the upper opening of the container body 11. For the sake of convenience, in the following description, the side of the upper lid member 12A of the transportation container 10 will be referred to as "top" and the side of the lower lid member 12B as "bottom."

The container body 11 is a cylindrical body of double structure, made of plates of steel that shields γ rays, such as carbon steel and stainless steel. The container body 11 includes an outer cylinder part 14 and an inner cylinder part 15 which is arranged inside the outer cylinder part 14. For example, as shown in FIG. 3, the outer cylinder part 14 is formed to have a generally square cross section perpendicular to its longitudinal direction. The inner cylinder part 15 is formed to have a square cross section perpendicular to its longitudinal direction. As shown in FIGS. 1 and 2, the outer cylinder part 14 and the inner cylinder part 15 are integrated by a plurality of ribs 16. The space between the outer cylinder part 14 and the inner cylinder part 15 is filled with a buffer material 17 which absorbs impact when the transportation container 10 falls and onto the ground etc. An example of the buffer material 17 is urethane foam which also has a heat insulation property. It would be appreciated that measures may be taken to provide a fire prevention function, like installing a fireproof sheet inside the container body 11 or between the upper lid member 12A and lower lid member 12B and the buffer material 17.

The upper lid member 12A seals the upper opening of the container body 11 to hermetically seal the interior of the container body 11. The upper lid member 12A is made of a plate of steel that shields γ rays, such as stainless steel and carbon steel, and is filled with the buffer material 17 inside. As mentioned above, when loading the fuel assembly 50 into the transportation container 10 and when taking the fuel assembly 50 out of the transportation container 10, the transportation container 10 is arranged upright and the upper lid member 12A is removed. The fuel holder 20 (fuel assembly 50) is loaded or unloaded through the upper opening of the container body 11.

The lower lid member 12B seals the lower opening of the container body 11 to hermetically seal the interior of the container body 11. Like the upper lid member 12A, the lower lid member 12B is made of a plate of steel that shields γ rays, such as stainless steel and carbon steel, and is filled with the buffer material 17 inside. This lower lid member 12B is provided so that it can be removed to allow operations through the bottom opening when doing maintenance or the like of the interior of the transportation container 10. The lower lid member 12B therefore will not be removed but functions as a bottom plate of the container body 11 during the loading and unloading of the fuel assembly 50. It should be noted that when the foregoing maintenance and the like are not needed or when maintenance can be performed with only the upper opening, the container body 10 may have a closed-bottomed structure with the bottom lid member 12B omitted.

Moreover, shock absorbers 19a are attached to both ends of the container body 11 so as to entirely cover the outer sides of the upper lid member 12A and the lower lid member 12B. The shock absorbers 19a absorb impact when the transportation container 10 in an upright position falls vertically, horizontally, or obliquely onto the ground or the like. In addition, a plurality of shock absorbers 19b are attached along the periphery of the container body 10 (in FIG. 1, only one of which is shown). The shock absorbers 19b absorb impact when the transportation container 10 in a sideways position shown in FIG. 1 falls vertically onto the ground or the like.

The fuel assembly 50 to be contained in the container body 11 is one intended for use in a pressurized water reactor plant, and is composed of a plurality of fuel rods 51 which are tied by a plurality of support grids 52. An upper nozzle 53 and a lower nozzle 54 are arranged on respective ends of the fuel rods 51. As shown in FIG. 3, the fuel assembly 50 has a cross section of square shape perpendicular to its longitudinal direction, and is accommodated in the prismatic pipe 30 with the outer periphery of the square shape covered by the fuel holder 20 to be described later. As shown in FIG. 1, with the fuel assembly 50 contained in the internal space 13 of the container body 11, the upper nozzle 53 is arranged on the upper end side of the container body 11 and the lower nozzle 54 is arranged on the lower end side of the container body 11.

Next, the mechanism for holding the fuel assembly 50 in the internal space 13 of the container body 11 will be described in detail.

The fuel holder 20 is made of steel plates of carbon steel, stainless steel, or the like. As shown in FIG. 1, the fuel holder 20 is a long pipe-like member which is formed to have a longitudinal dimension greater than the length of the fuel assembly 50. As shown in FIG. 3, the fuel holder 20 is formed so that its inner periphery coincides with the outer periphery of the fuel assembly 50 in shape, with a cross section of square shape perpendicular to the longitudinal direction. The fuel holder 20 is attached to the fuel assembly 50 in advance before the fuel assembly 50 is loaded into the transportation container 10.

As shown in FIG. 4, the fuel holder 20 is composed of two steel plates 21 and 22 which have a cross section of L shape perpendicular to the longitudinal direction. One ends 21a and 22a of the respective L-shaped steel plates 21 and 22 along the longitudinal direction are rotatably linked to each other via hinges 29. As shown in FIGS. 1 and 2, a lower end 23 of the fuel holder 20 is formed in a tapered shape inclining toward the inside of the fuel holder 20, i.e., so as to taper off toward the top (downward). Hereinafter, the lower end 23 of the fuel holder 20 (one end of the fuel holder) will be referred to as a lower taper part 23. The four inclined surfaces of the lower taper part 23 are formed at the same inclination angle. As employed herein, the inclination angle refers to the angle that the inclined surfaces form with respect to a horizontal surface when the fuel holder 20 is arranged upright with the longitudinal direction of the fuel holder 20 perpendicular. It should be noted that, as a structure for fixing the fuel assembly 50, the L-shaped steel plates 21 and 22 may have protrusions (not shown) at which the fuel holder 20 makes contact with any one or more of the support grids 52, the upper nozzle 53, and the lower nozzle 54 of the fuel assembly 50 which have excellent structural strength.

Similarly, an upper end 28 of the fuel holder 20 is formed in a tapered shape inclining toward the inside of the fuel holder 20, i.e., so as to taper off toward the top. Hereinafter, the upper end 28 of the fuel holder 20 (the other end of the fuel holder) will be referred to as an upper taper part 28. The four inclined surfaces of the upper taper part 28 are formed at the same inclination angle.

When putting the fuel assembly 50 into this fuel holder 20, as shown in FIG. 4, one L-shaped steel plate 21 is opened and the fuel assembly 50 is placed with two of its surfaces in contact with the inner surfaces of the other L-shaped steel plate 22. The one L-shaped steel plate 21 is then rotated, and the other ends 21b and 22b of the respective L-shaped steel plates 21 and 22 are connected and closed with each other by a not-shown connector. This completes the attachment of the fuel holder 20, whereby the periphery of the fuel assembly 50 is covered with the fuel holder 20, i.e., protected by the fuel holder 20.

The prismatic pipe 30 is a structure for accommodating and supporting the fuel holder 20 inside the container body 11. The prismatic pipe 30 is arranged inside the container body 11 in advance. As shown in FIG. 1, the prismatic pipe 30 is formed to have a longitudinal dimension greater than that of the fuel holder 20. As shown in FIG. 3, the cross section of the prismatic pipe 30 perpendicular to the longitudinal direction is formed in a square shape slightly greater than the cross-sectional shape of the fuel holder 20.

The prismatic pipe 30 is made of an aluminum composite material or aluminum alloy that is formed by adding boron or boron compound powder having a neutron absorbing capability to aluminum or aluminum alloy powder. An example of the boron compound that can be used in the embodiment is $B_4C$. In the present embodiment, the foregoing metal material having a neutron absorbing capability is utilized as a structural strength member. More specifically, the prismatic pipe 30 has both the function of preventing the fuel assembly 50 from reaching criticality (assurance of subcriticality) through the provision of neutron absorbability and the function of preventing the fuel assembly 50 from being deformed by a drop impact. In addition, as shown in FIGS. 1 and 3, the entire periphery of the prismatic pipe 30 is covered with high density polyethylene 45 which has a neutron absorbing capability.

As shown in FIG. 2, the lower end of the prismatic pipe 30 (one end of the prismatic pipe) is coupled with a lower guide member 40, or first guide member, whereby the lower opening is blocked. The lower guide member 40 is made of a material such as stainless steel, and has a recess 41 which conforms to the outer shape of the lower taper part 23 of the fuel holder 20 described above.

Figure 5:
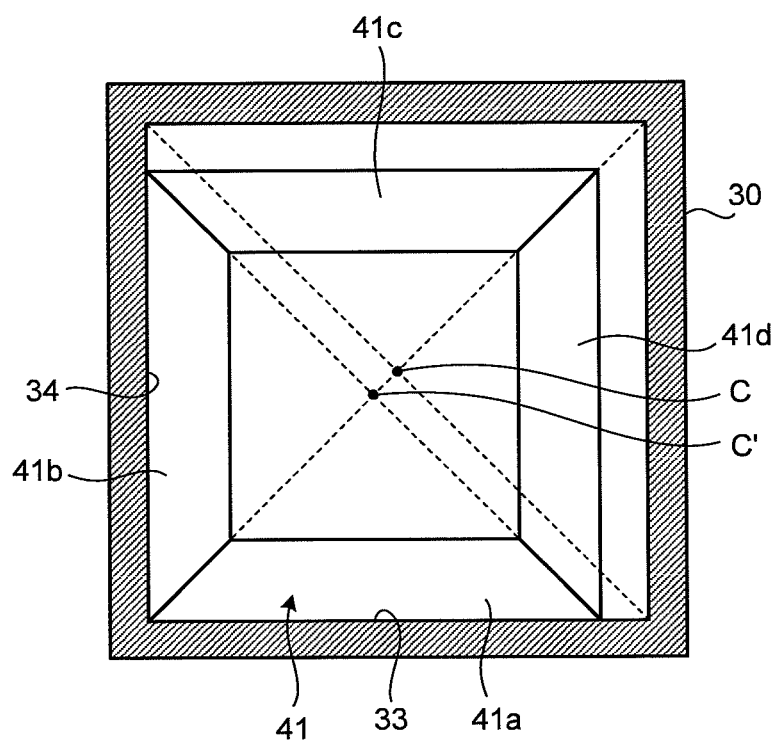
FIG. 5 is a schematic plan view of a lower guide member which is arranged at the lower end of the prismatic pipe.

FIG. 5 is a schematic plan view of the lower guide member which is arranged at the lower end of the prismatic pipe. As shown in FIGS. 2 and 5, the recess 41 is composed of four surfaces 41a, 41b, 41c, and 41d conforming to the four inclined surfaces of the fuel holder 20, and is formed in a tapered shape that tapers off downward. As shown in FIG. 5, the center C' of the recess 41 is located off the center C of the prismatic pipe 30 by equal distances in directions toward the surface 33 and toward the surface 34 of the prismatic pipe 30. Here, the center of the recess 41 refers to the intersection of the diagonals of the square shape when the recess 41 is seen in a plan view. The center of the prismatic pipe 30 refers to the intersection of the diagonals of the square inner peripheral shape of the prismatic pipe 30.

When inserting the fuel holder 20 holding the fuel assembly 50 into the interior of the prismatic pipe 30, the lower taper part 23 of the fuel holder 20 is guided by the recess 41. When the lower taper part 23 is fully inserted into the recess 41 as shown in FIG. 2, the fuel holder 20 is located in a position where two surfaces 24 and 25 of the fuel holder 20 are in contact with the two surfaces 33 and 34 among the four surfaces that constitute the prismatic pipe 30 as shown in FIG. 3. The position where the fuel holder 20 is located here will be referred to as a "storing position for transportation." During transportation, the lower taper part 23 of the fuel holder 20 is held by the recess 41 of the lower guide member 40.

After the lower taper part 23 of the fuel holder 20 is held by the lower guide member 40, an upper guide member 60, a second guide member, is installed on the upper end of the prismatic pipe 30 (the other end of the prismatic pipe) to seal the upper opening. The upper guide member 60 is made of the same material as that of the lower guide member 40, and has a recess 61 which conforms to the shape of the upper taper part 28 of the fuel holder 20. The upper guide member 60 is installed on the upper end of the prismatic pipe 30 so that the upper taper part 28 conforms to the recess 61.

Moreover, as shown in FIGS. 1 and 3, the prismatic pipe 30 has bolt holes which are formed in the vicinities of the respective top ends of surfaces 35 and 36 opposed to the foregoing two surfaces 33 and 34, respectively. Holder fixing bolts 37a and 37b are threadedly engaged with the respective bolt holes. As shown in FIG. 1, operating handles 38a and 38b (38b is not shown) are attached to the heads of the holder fixing bolts 37a and 37b, respectively. Rotating the respective operating handles 38a and 38b rotates the respective holder fixing bolts 37a and 37b so as to advance in directions perpendicular to the surfaces 35 and 36. As shown in FIG. 3, the advancing directions of the two holder fixing bolts 37a and 37b are orthogonal to each other. Advancing one of the holder fixing bolts, 37a, presses the surface 24 of the fuel holder 20 against the surface 33 of the prismatic pipe 30 in the vicinity of the upper end of the fuel holder 20. Similarly, advancing the other holder fixing bolt 37b presses the surface 25 against the surface 34 of the prismatic pipe 30 in the vicinity of the upper end of the fuel holder 20. Incidentally, in the example shown in FIG. 3, there is a gap of 2 mm or so between the surface 26 of the fuel holder 20 and the surface 35 of the prismatic pipe 30, and between the surface 27 of the fuel holder and the surface 36 of the prismatic pipe 30, when the fuel holder 20 is placed in the storing position for transportation.

With the foregoing configuration, the lower end of the fuel holder 20 is supported by the lower guide member 40 while the upper end is pressed and fixed by the holder fixing bolts 37a and 37b. In a conventional transportation container, it has been needed to arrange fastening devices over the entire length of a fuel assembly and fasten the fuel assembly in a loading operation. According to the present embodiment, the fuel assembly 50 is covered with the fuel holder 20 when contained in the container body 11, and the rigidity of the fuel holder 20 prevents the occurrence of deformation of the fuel assembly 50 under transportation. Consequently, simply fixing the upper end of the fuel holder 20 with two bolts can prevent the fuel assembly 50 from moving and being deformed inside the prismatic pipe 30 during transportation.

In the present embodiment, as described above, the lower guide member 40 is used to semiautomatically position the fuel holder 20 to the storing position for transportation. This eliminates the need for the operation of adjusting the storing position of the fuel holder 20, and then the upper end of the fuel holder 20 can be simply pressed and fixed by the holder fixing bolts 37a and 37b to complete the loading operation. The operation of loading the fuel assembly can thus be easily performed as compared to that in the conventional container.

As shown in FIG. 3, two guide rails 46 are attached to one of the four surfaces that constitute the inner cylinder part 15, the one constituting the bottom surface when the transportation container 10 is placed sideways, along the longitudinal direction of the inner cylinder part 15. A plurality of antivibration spring mechanisms 47, each including a slide plate 47a and a spring 47b, are arranged between the guide rails 46 and the prismatic pipe 30 at predetermined intervals along the longitudinal direction of the guide rails 46. The slide plates 47*a* are attached so as to be slidable over the guide rails 46. The springs 47*b* are arranged with the direction of expansion and contraction of the springs in parallel with the longitudinal direction of the prismatic pipe 30 and the guide rails 46, and are fixed to the slide plates 47*a* and the prismatic pipe 30. The provision of such antivibration spring mechanisms 47 suppresses transmission of vibrations to the prismatic pipe 30 during transportation.

As shown in FIG. 1, support spring mechanisms 49 are arranged between the lower lid member 12B and the lower guide member 40. The support spring mechanisms 49 function to bear the load of the prismatic pipe 30 when the transportation container 10 is placed upright for the operation of loading the fuel assembly 50.

There are also provided internal shock absorber bodies 48 between the upper guide member 60 and the upper nozzle 53 of the fuel assembly 50 and between the lower guide member 40 and the lower nozzle 54 of the fuel assembly 50, respectively. The internal shock absorber bodies 48 are intended to suppress deformation of the upper nozzle 53 and the lower nozzle 54 in case that the transportation container 10 placed upright falls vertically. The internal shock absorber bodies 48 are made of resin, wood, metal, or the like.

Next, the procedure for loading the fuel assembly 50 into the transportation container 10 of the foregoing configuration will be described. Initially, the fuel holder 20 is placed with the longitudinal direction of the fuel holder 20 perpendicular. The fuel assembly 50 is put into the fuel holder 20. The transportation container 10 is placed with the lower lid member 12B down and the upper lid member 12A up. The prismatic pipe 30 and the lower guide member 40 are arranged in the transportation container 10 in advance.

Next, the fuel holder 20 containing the fuel assembly 50 is hung up. The fuel holder 20 is inserted into the prismatic pipe 30 in the transportation container 10. When the lower taper part 23 of the fuel holder 20 reaches the recess 41 in the lower guide member 40, the lower taper part 23 of the fuel holder 20 is guided by the recess 41 as described above. As shown in FIG. 5, the center C' of the recess 41 is located off the center C of the prismatic pipe 30 by the distances mentioned above. Consequently, the fuel holder 20 is semiautomatically arranged into the storing position for transportation shown in FIG. 3. Subsequently, the holder fixing bolts 37*a* and 37*b* are rotated to advance, whereby the two surfaces 24 and 25 of the fuel holder 20 are pressed against and fixed to the two surfaces 33 and 34 of the prismatic pipe 30. This completes the operation of loading the fuel assembly 50.

Figure 6:
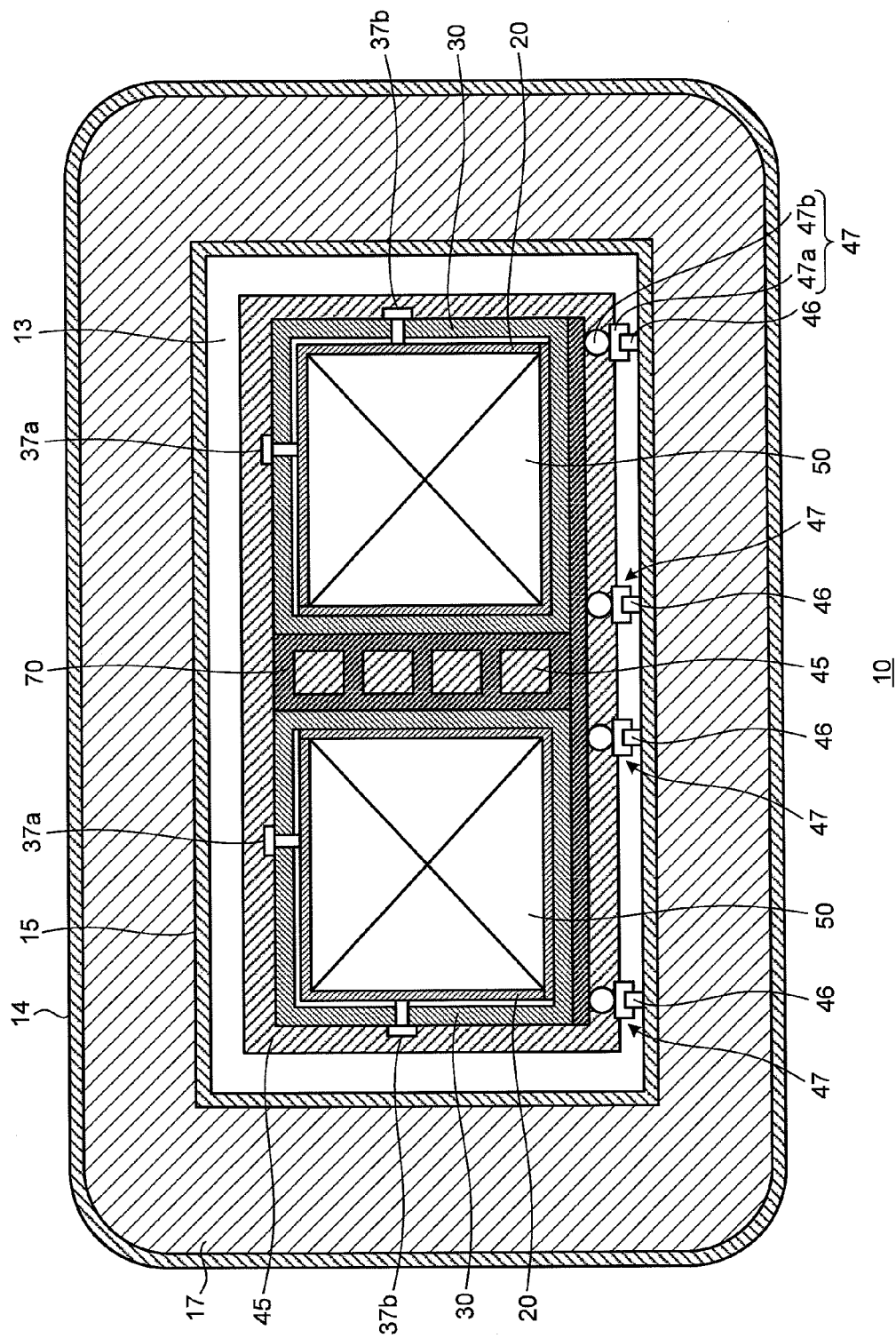
FIG. 6 is a cross-sectional view showing another configuration example of the transportation container according to the present embodiment.

Now, FIG. 6 is a cross-sectional view showing another configuration example of the transportation container according to the present embodiment. As shown in FIG. 6, when loading two or more fuel assembles 50 into the container body 11, two prismatic pipes 30 are arranged in a row in the container body 11. A spacer 70 is interposed between the two prismatic pipes 30 so that the two fuel assemblies 50 accommodated are maintained at a predetermined interval. The spacer 70 shown as an example in FIG. 6 is made of a combination of steel plates such as carbon steel and stainless steel, aluminum alloys, or the like. The two prismatic pipes 30 are covered with high-density polyethylene 45 which has a neutron absorption capability. The interior of the spacer 70 is also filled with the high-density polyethylene 45. The procedure for loading fuel holders 20 containing fuel assemblies 50 into the container body 11 is the same as the foregoing procedure. A description thereof will thus be omitted.

As has been described above, by using the transportation container 10 of a fuel assembly according to the present embodiment, when the fuel holder 20 containing the fuel assembly 50 is inserted into the prismatic pipe 30, the lower taper part 23 of the fuel holder 20 is guided by the recess 41 of the lower guide member 40. The fuel holder 20 is thereby semiautomatically positioned to the storing position for transportation. As a result, the operation of loading the fuel assembly 50 into the transportation container 10 can be easily performed. Moreover, since the fuel assembly 50 is protected by the fuel holder 20 when loaded into the container body 11, it is possible to suppress a drop in integrity and reliability due to force or friction acting on the fuel assembly 50 in the loading operation. Furthermore, during transportation, deformation of the fuel assembly 50 is suppressed by the rigidity of the fuel holder 20. This makes it possible to reduce the points to be pressed by the holder fixing bolts 37*a* and 37*b* for pressing and fixing the fuel assembly 50 as compared to those in the conventional container. This can significantly simplify the internal structure of the container body 11.

The foregoing embodiment has dealt with the configuration that the upper guide member 60 and the upper taper part 28 are provided in addition to the lower guide member 40 and the lower taper part 23 for securer positioning of the fuel holder 20. However, the upper guide member 60 and the upper taper part 28 are not necessarily needed, and it is possible to smoothly position the fuel holder 20 by only the lower guide member 40 and the lower taper part 23. Since the fuel holder 20 is pressed and fixed by the holder fixing bolts 37*a* and 37*b* in the vicinity of the upper end, the upper guide member 60 and the upper taper part 28 may be omitted without a backlash in the vicinity of the upper end of the fuel holder 20.

The foregoing embodiment has dealt with the configuration that the center position of the recess 41 in the lower guide member 40 is located a predetermined distance off the center of the prismatic pipe 30 so that the fuel holder 20 is guided into the storing position for transportation. However, the fuel holder 20 may be guided into the storing position for transportation by other configurations.

In the foregoing embodiment, the holder fixing bolts 37*a* and 37*b* are used as pressing members for pressing the fuel holder 20 against the prismatic pipe 30. However, members such as plate members other than bolts may be used.

In the foregoing embodiment, the prismatic pipe 30 and the lower guide member 40 are configured as separate members. However, the lower guide member 40 may be integrally molded on the lower end of the prismatic pipe 30.

In the foregoing embodiment, the fuel holder 20 has a rectangular cross section since a rectangular-sectioned fuel assembly intended for a light water reactor is applied as the fuel assembly 50 to be accommodated in the transportation container 10. Such a configuration is just an example, and the fuel holder 20 is formed to have a cross-sectional shape conforming to that of the fuel assembly 50. For example, when applying a hexagonal-sectioned fuel assembly intended for a fast breeder reactor, a fuel holder 20 and a prismatic pipe 30 having a hexagonal cross-sectional shape are used.

INDUSTRIAL APPLICABILITY

As has been described above, the transportation container of a fuel assembly according to the present invention is suited for transportation of fresh fuel assemblies manufactured in a fuel production plant.

REFERENCE SIGNS LIST

10 transportation container
11 container body 12A upper lid member
12B lower lid member
13 internal space
14 outer cylinder part
15 inner cylinder part
16 rib
17 shock absorbing material
19a, 19b shock absorber
20 fuel holder
21, 22 L-shaped steel plate
23 lower taper part (one end of fuel holder)
24, 25, 26, 27 surface (of fuel holder)
28 upper taper part (the other end of fuel holder)
30 prismatic pipe
33, 34, 35, 36 surface (of prismatic pipe)
37a, 37b holder fixing bolt (pressing member)
38a, 38b operating handle
40 lower guide member (first guide member)
41 recess
45 high-density polyethylene
46 guide rail
47 antivibration spring mechanism
48 internal shock absorber body
49 support spring mechanism
50 fuel assembly
51 fuel rod
52 support grid
60 upper guide member (second guide member)
61 recess
70 spacer

The invention claimed is:

1. A transportation container of a fuel assembly, comprising:
a container body that has an opening in one end;
a lid member that seals the opening;
a prismatic pipe that is formed in a rectangular shape and is arranged in the container body;
a fuel holder that is formed in a rectangular shape and covers a side surface of a fuel assembly when inserted into the prismatic pipe; and
a pressing member that is arranged on the prismatic pipe and presses, in the prismatic pipe, the fuel holder against an inner wall surface of the prismatic pipe, wherein
one end of the fuel holder includes four first surfaces inclined toward downward and inward of the fuel holder such that the one end is formed in a tapered shape having a single opening, and
one end of the prismatic pipe is provided with a first guide member that has a recess including four second surfaces inclined toward downward and inward of the prismatic pipe to correspond to each of the four surfaces of the one end of the fuel holder in order to be formed in a tapered shape, a center of the recess is located off a center of the prismatic pipe by equal distances in directions toward two adjacent inner wall surfaces of the prismatic pipe; wherein
an internal shock absorber body is provided such that the internal shock absorber body is inserted in the single opening of the tapered shape and is protruded from the single opening to suppress deformation of the fuel assembly.

2. The transportation container of a fuel assembly according to claim 1, wherein
the one end of the fuel holder is guided by the recess in the first guide member, whereby the fuel holder is arranged in contact with two inner walls of the prismatic pipe, and
the fuel holder is accommodated in the prismatic pipe so that the fuel holder is pressed against the two inner wall surfaces of the prismatic pipe by the pressing member.

3. The transportation container of a fuel assembly according to claim 2, wherein the fuel holder includes two plate members that have an L-shaped cross section in a direction perpendicular to a longitudinal direction, and are rotatably linked to each other through a hinge.

4. The transportation container of a fuel assembly according to claim 2, wherein
an other end of the fuel holder is formed in a tapered shape inclining toward the inside of the fuel holder,
an other end of the prismatic pipe is provided with a second guide member that has a recess corresponding to the other end of the fuel holder, and
the one end of the fuel holder is guided by the recess in the first guide member and the other end of the fuel holder is guided by the recess in the second guide member, whereby the fuel holder is configured to be arranged in contact with the two inner walls of the prismatic pipe.

5. The transportation container of a fuel assembly according to claim 4, wherein the fuel holder includes two plate members that have an L-shaped cross section in a direction perpendicular to a longitudinal direction, and are rotatably linked to each other through a hinge.

6. The transportation container of a fuel assembly according to claim 1, wherein the prismatic pipe is made of aluminum or an aluminum alloy to which boron or a boron compound is added.

* * * * *